United States Patent [19]

Castel et al.

[11] 4,400,112

[45] Aug. 23, 1983

[54] CONNECTING AND DISCONNECTING DEVICE FOR A GUIDE LINE

[75] Inventors: Yvon Castel; Michel Iato, both of Pau, France

[73] Assignee: Societe Nationale Elf Aquitaine (Production), Paris, France

[21] Appl. No.: 336,415

[22] Filed: Dec. 31, 1981

[30] Foreign Application Priority Data

Jan. 13, 1981 [FR] France .................................. 81 00463

[51] Int. Cl.³ ........................... E02D 5/54; E02D 5/74
[52] U.S. Cl. .................................. 405/224; 294/66 A; 294/86.24; 166/340; 166/341; 405/195; 403/2
[58] Field of Search ................ 166/340, 341, 342, 343; 294/86.24, 86.18, 86.1, 93; 403/2, 361; 405/195, 224

[56] References Cited

U.S. PATENT DOCUMENTS

| | | | |
|---|---|---|---|
| 3,163,228 | 12/1964 | Hayes | 294/86.18 X |
| 3,493,043 | 2/1970 | Watkins | 166/341 |
| 4,215,951 | 8/1980 | Knox | 405/195 X |
| 4,257,720 | 3/1981 | Ostgaard | 405/224 X |
| 4,320,993 | 3/1982 | Hunter | 405/224 |
| 4,347,012 | 8/1982 | Glidden | 403/2 |

Primary Examiner—Wayne L. Shedd
Attorney, Agent, or Firm—Poms, Smith, Lande & Rose

[57] ABSTRACT

The invention relates to installation of underwater equipment, more specifically for use in oil-fields.

This new device for connecting and disconnecting a guide line between an installation on the seabed and a floating platform comprises a cylindrical adapter, free to rotate on its own axis, and provided with means of guiding, directing, positioning lengthwise and locking into a cylindrical sleeve, forming the upper portion of a guide post fixed to the underwater installation. The locking mechanism comprises at least one locking head, which extends out from and can be detached from a locking bar. The lower edge of this locking head forms a retracting cam, while the horizontal upper surface forms a locking edge.

Such a device can be used to connect and disconnect the guide line by remote control, from a floating platform.

9 Claims, 8 Drawing Figures

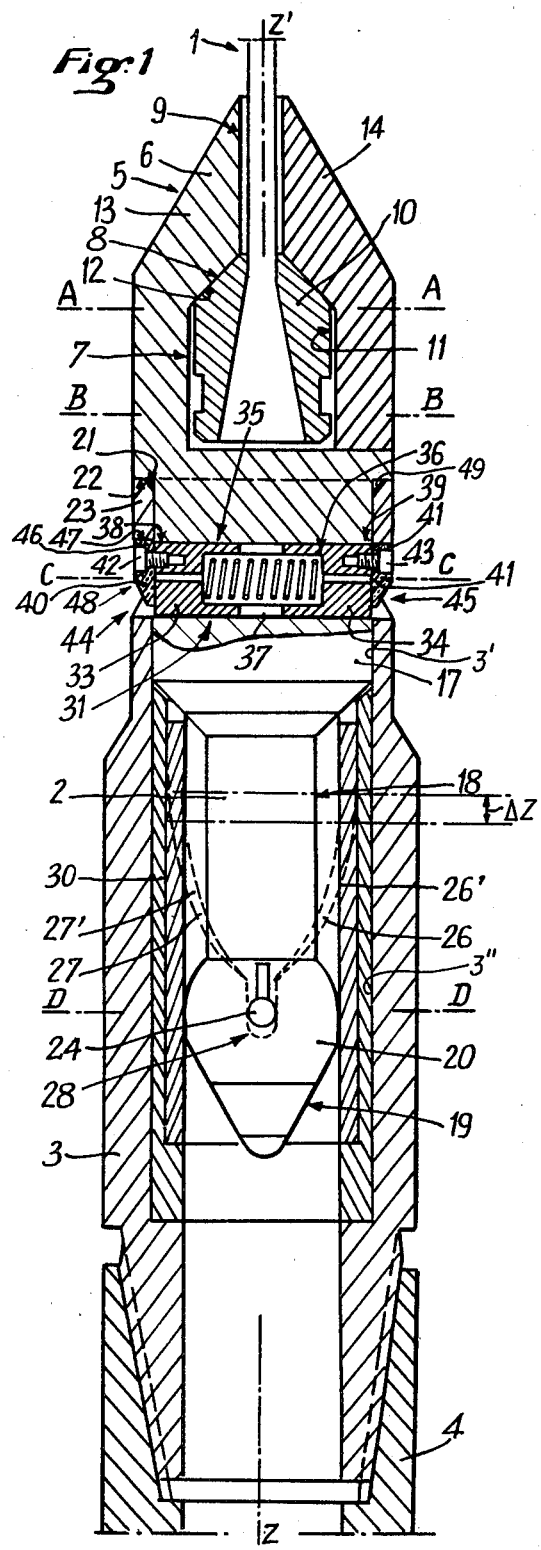
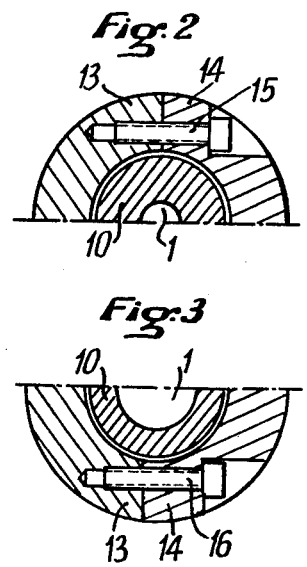
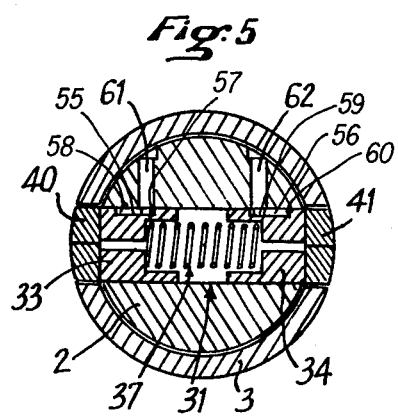
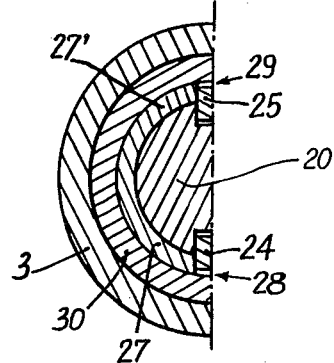

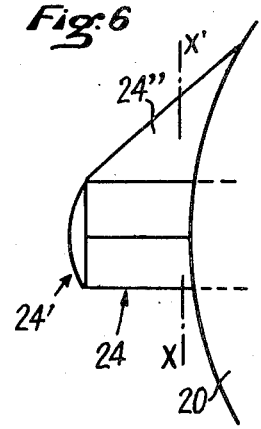
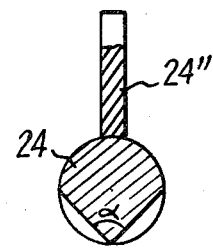
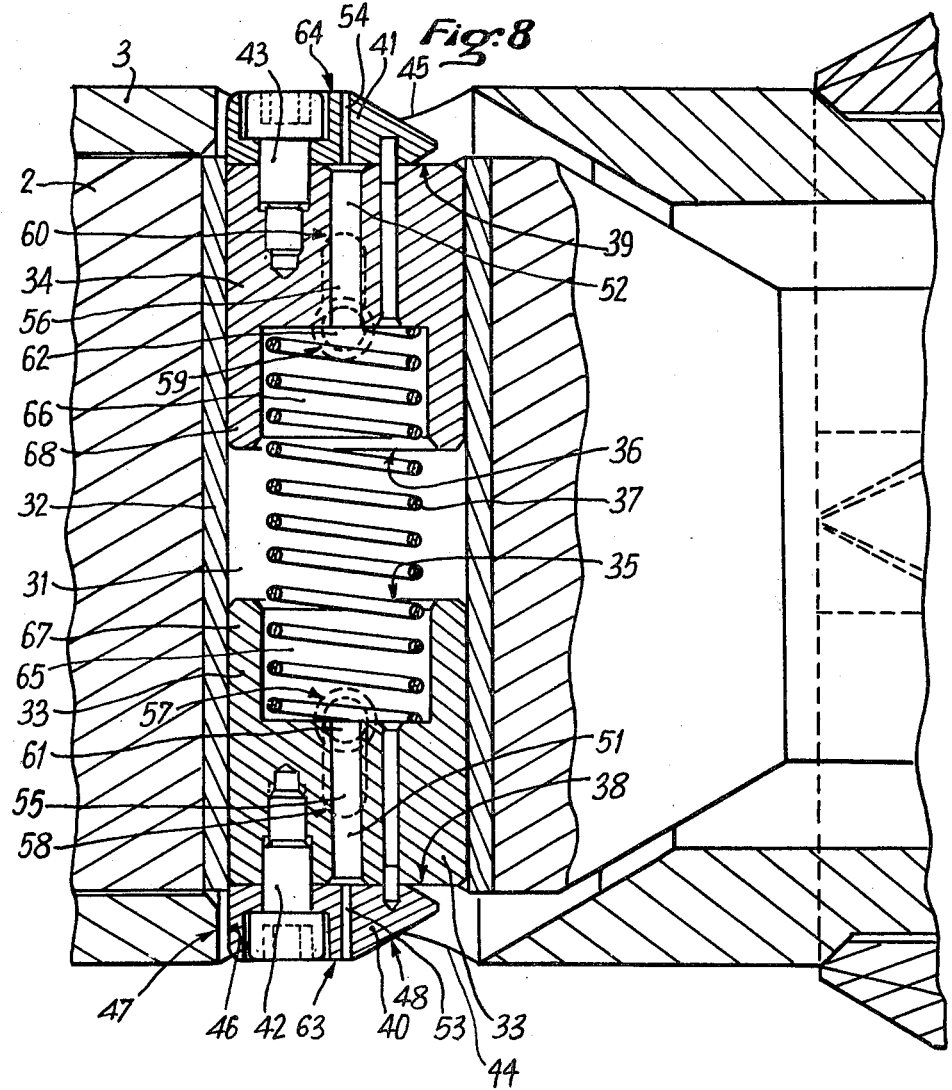

CONNECTING AND DISCONNECTING DEVICE FOR A GUIDE LINE

This invention concerns a device for connecting and disconnecting a guide line between an installation on the seabed and a floating platform, in order to enable guiding, orientating, positioning and locking systems to be operated from the surface.

All existing such devices require the intervention of a diver, at least for locking and unlocking operations.

An exemplary prior device of this kind comprises a cylindrical adapter the outside diameter of which is slightly smaller than the inside diameter of a sleeve forming the upper section of a vertical guide-post fixed to the seabed installation. This cylindrical adapter is provided with a guidance and directional device usually in the form of a stud on the outside circumference of the adapter, which can slide into a lengthwise groove and then into a circular groove both cut into the inside surface of the sleeve. The circular groove extends over a given segment of the sleeve circumference, and is limited by a stop, which forms a positioning device in the connection position. Finally, the adapter is provided with a locking system, comprising a screw which passes through a hole drilled in the side of the sleeve. In the connected position, this hole is opposite a threaded hole drilled in the adapter, perpendicular to its axis line.

In such a prior device, the adapter attached to the end of a guide line, which is operated from the surface platform, is guided and placed in position directly over the sleeve, by a diver or a remote-controlled device, then inserted into the sleeve in such a way that the stud moves first into the lengthwise slot, as a result of a downward movement, and then into the circular slot, by a segmental rotary movement. A screw is then inserted through the lengthwise slot and screwed into the threaded hole in the adapter.

The adapter is fitted and moved inside the sleeve, then locked with the screw, by a human diver. The adapter movements can be mechanized, but the locking operation continues to require manual intervention.

Disconnection involves reversal of this sequence, and similarly requires the intervention of a diver, at least to unlock the adapter.

The new device described below overcomes such difficulties, being provided with mechanisms which are capable of performing the sequence of connecting operations through the effect of gravity, and the sequence of disconnecting operations through the use of a tool which slides along the guide line, and if necessary through traction on the guide line.

This new connection and disconnection device for a guide line between a floating platform and a seabed installation comprises a cylindrical adapter, attached by a swivel connector to the end of the guide line, provided with a guiding and directional mechanism, a longitudinal positioning surface, and at least one locking head, which come into contact respectively with guide ramps, a positioning seat, and at least one locking head slot, on the inside of a cylindrical sleeve, extending upwards from a guide post fixed to the underwater installation. This new device is characterized by the fact that the locking head constitutes a detachable extension of a locking bar bearing on a compression spring, the lower surface of the said locking head, which forms an angle with the axis of the adapter, constituting a cam, designed to come into contact with a tapering surface cut into the inside upper edge of the sleeve, while the upper surface of the said locking head, which is perpendicular to the axis of the adapter, forming a locking edge designed to rest on the upper edge of the locking slot.

In one recommended embodiment, the device comprises two locking bars which are symmetrical to the adapter axis line, which can move lengthwise inside a cylindrical cavity on a plane perpendicular to the adapter axis line, and the inner ends of which rest on the ends of a compression spring, while the outer ends rest on the locking heads fixed to the locking bars by shearing bolts, the said locking bars and heads containing bore-holes, which provide communication between the inside of the cavity and the outside atmosphere.

To facilitate operation of the compression spring and guidance of the locking devices, the ends of this spring fit into two cylindrical cavities in the inner ends of the locking bars.

To facilitate disconnection, the cross-sectional area of each locking head is preferably smaller than the cross-sectional area of each locking bar.

This provision is obtained in particular when each locking bar has a circular cross section, while the cross section of each locking head is a square which fits inside the cross-sectional area of the locking bar and when the locking head is attached to the locking bar by means of a shearing bolt with given mechanical strength.

In this same recommended embodiment of the invention, each locking bar contains at least one longitudinal groove, shorter than the length of the bar, limited at each end by a stop, and inside which slides a stud fixed to the adapter on an axis perpendicular to the common axis of the locking bars, the two inner stops limiting the distance between the outer ends of the locking bars, in the locking position, to the inside diameter of the sleeve, and the two outer stops limiting the distance between the outer ends of the locking heads, in the unlocking position, to the outside diameter of the cylindrical part of the adapter.

In these embodiments, the guidance and directional mechanism comprises two pins, on diametrically opposite axis lines, perpendicular to the adapter axis line, and with straight cross sections, designed to move along spiral guides on the inside surface of the sleeve, these guides being limited at the bottom by a recess, which determines the position of the pins for connection of the adapter, corresponding to the position in which the locking heads are opposite the locking slots.

To allow the locking heads to be retracted during disconnection by external means, these slots consist of openings in the side of the sleeve.

In various embodiments, the adapter is attached to the connector device by the upper end of the cylindrical part, the diameter of which is smaller than the connector diameter, so that part of the flat annular surface, at the point of narrowing is supported by a flat annular seat forming the upper end of the sleeve, thereby forming the means of longitudinal positioning of the adapter inside the sleeve.

In these same embodiments, the cylindrical part of the adapter attached to the connector leads to a lower cylindrical part with a considerably smaller diameter than the inside diameter of the sleeve, this lower part leading to a bulb-shaped component, the larger part of which has a spherical circumference, slightly smaller than the inside circumference of the sleeve. This spherical part comprises two pins, diametrically opposite on its equatorial circumference, and which are designed to be supported by spiral guides and their symmetrical guides on the inside surface of the sleeve, thereby forming the means of directional positioning of the adapter inside the sleeve.

To facilitate directional positioning of the device during the connection operation, the connector between the adapter and the guide line is preferably of a type that leaves the adapter free to rotate on its own axis. This can be obtained by using a swivel.

The features and advantages of this invention will become clear from the following description of one possible embodiment of such a device, with reference to the accompanying figures:

FIG. 1, showing the general layout of the connection device;

FIG. 2, showing a semi-cross-sectional view across AA on FIG. 1, of the device attaching the adapter to the guide line;

FIG. 3, showing a semi-cross-sectional view across BB on FIG. 1, of the device attaching the adapter to the guide line;

FIG. 4, showing a semi-cross-sectional view across DD on FIG. 1, of the guidance mechanism;

FIG. 5, showing a cross-sectional view across CC on FIG. 1, of the locking mechanism;

FIG. 6, showing a side view of a guide pin;

FIG. 7, showing a cross-sectional view of a guide pin, along the plane XX' on FIG. 6;

FIG. 8, showing a cross-sectional view through the locking device.

FIG. 1 shows a general view of the device for connecting and disconnecting a guide line between a floating platform and an underwater installation (not shown here).

This device comprises an adapter (2), the outside of which is formed of coaxial surfaces of revolution, for each of which the outside diameter of the cylindrical casing is less than the inside diameter of the corresponding cross section of a sleeve (3), inside which it fits, and which forms the upper end of a vertical guide post (4) fixed to the underwater installation.

For reasons of machining and assembly, the sleeve consists of a socket screwed on to the top end of the guide post (4).

The adapter (2) is connected to the guide line (1) by a swivel connector (5), which leaves it free to rotate on its own axis.

This connector (5) is formed of an outer component (6) attached to the adapter and extending upwards from it, and which contains a cylindrical cavity (7), extending upwards into a tapering surface and opening at the top through a cylindrical passage (9), smaller in diameter than the cylindrical cavity (7). The tapering surface (8) and cylindrical passage (9) are on the same axis line.

The inner component (10) that fits into this cavity (7) has a cylindrical circumference, which extends into a tapering surface (12), designed to come into contact with the tapering surface of the outer component (6). The inner component (10) is attached to the end of the guide line (1) by a method such as anchoring in a coaxial cavity. The guide line can run freely through the passage (9).

To facilitate assembly and detachment of the connector (5), the outer component (6) usually consists of a main part (13) and a secondary part (14), which covers a sufficiently large area of the cylindrical cavity (7) and tapering cavity (8) to allow the swivel component (10) to be inserted into or withdrawn from its recess, once the secondary part (14) has been removed.

This secondary part (14) is attached to the main part (13) by four bolts, the axis of two of which (e.g. 15) is situated on the plane AA, and the axis of the other two of which (e.g. 16) is situated of the plane BB, as shown in FIGS. 2 and 3, showing cross-sectional views of the connector (5) along planes AA and BB, perpendicular to the adapter axis, and comprising the main part (13), secondary part (14), inner component (10) and guide line (1).

The adapter (2) comprises three components, extending downwards, and the outside circumferences of which are formed by coaxial surfaces of revolution:

1-a component (17) attached to the connector (5) with a cylindrical circumference, the diameter of which is slightly smaller than the inside diameter of the section (3') of the sleeve (3) into which it fits;
2-a component (18) with a cylindrical circumference, connected to the first component (17) by a tapering part, and the diameter of which is considerably smaller than the inside diameter of the section (3'') of the sleeve into which it fits;
3-a bulb-shaped component (19), the larger part (20) of which is spherical, its diameter being slightly smaller than the inside diameter of the sleeve section (3''), and which is connected at the top to the base of the second component (18), and at the bottom, by a tapering circumference at a tangent to the circumference of the spherical portion, to a spherical cap end, the radius of which is much smaller than the radius of the spherical part.

The outside diameter of the first component (17) is smaller than the outside diameter of the connector (5), so that the connecting part between this component (17) and the connector (5) forms a flat annular bearing surface (21), designed to come into contact with an upper annular surface (22) at the top of the sleeve (3), which forms a seat, or means of longitudinal positioning of the adapter (2) inside the sleeve. The inside circumference of this annular surface (22) is chamfered, to make it easier for the adapter to penetrate into the sleeve (3).

The lower spherical part (20) of the adapter (2) has two studs (24 and 25) diametrically opposite each other and perpendicular to the axis line of the adapter, on the equatorial circumference of the lower spherical part (20). The cross sections of these studs are designed to match four spiral guides facing each other in pairs (e.g. 26 and 27), and their symmetrical guides (26' and 27') in relation to the plane of the figure. These spiral guides culminate in two recesses (28 and 29), which are symmetrically placed in relation to the axis of the adapter. One stud (24) fits into one recess (28), and the other stud (25) into the other recess (29). These recesses are formed of longitudinal slots, which allow the pins to move a few centimeters.

The spiral guides (26 and 27) share a single horizontal edge, located in a plane that is separated by a distance ΔZ (equal to 1 or 2 cm) from the plane on which is located the edge common to the symmetrical guides (26' and 27'), so that the studs (24 and 25) come into contact with their respective guides at slightly different points in time, to prevent any possibility of jamming.

The stud cross section that ensures best guidance is obtained from a cylindrical shank with a circular cross section, each of the ends of which, designed to come into contact with one of the spiral guides, is cut by two plane surfaces, so as to produce a dihedron with an angle α, such that α/2 is equal to the angle between the tangent to the guide and the matching generating line on the sleeve. This is illustrated in FIGS. 6 and 7. The line of intersection of the dihedron is formed by the lower generating line of the cylindrical shank forming the stud. The end of each stud forms a spherical portion (24'). A metal plate (24") with the outline of a rightangled triangle is fixed on one side of the right angle to the top generating line of the stud, and on the other side of the right angle to the surface of the lower spherical part (20) of the adapter.

The distance between the axis line of the cavities (28 and 29) and the upper edge (22) of the sleeve (3) is equal to the distance between the lower edge of each pin (24 and 25) and the horizontal annular surface (21) of the adapter (2).

FIG. 4 shows a cross section along plane DD on FIG. 1, including the diametrically opposite studs (24 and 25), the recesses (28 and 29), the guide (27) and the symmetrical guide (27), both fixed to the inside surface of the sleeve (3). For convenience of machining, these guides or ramps are fixed to a liner (30), which is then slid into the sleeve and fixed there.

The upper cylindrical part (17) of the adapter (2) contains a cylindrical hole (31), on an axis perpendicular to the adapter axis (2). This hole possibly contains a liner, as shown on FIG. 5, inside which hole two symmetrical locking bars (33 and 34) can slide horizontally.

FIG. 5 shows a cross sectional view of the various components of the locking mechanism, along the line CC in FIG. 1, and FIG. 8 shows the same mechanism as illustrated in FIG. 1, on a larger scale.

The inner ends (35 and 36) of the locking bars (33 and 34) press against the ends of a compression spring (37), and the outer ends (38 and 39) each rest on a locking head (40 and 41), the cross-sectional area of which is less than the cross-sectional area of the locking bars (33 and 34). Each locking head (40 and 41) is attached to the corresponding locking bar by at least one shearing bolt (42 and 43). The cross-sectional area of these locking heads (40 and 41) is slightly smaller than the areas of matching slots (44 and 45) through the side of the sleeve (3). The upper edge (46) of each locking head (e.g. 40) forms a bearing surface which is designed to come into contact with the upper edge (47) of the slot (44), while the lower edge (48), which forms an angle to the axis of the adapter (2), is designed to rest on a tapering surface (49) cut into the inside upper edge (50) of the sleeve (3).

Each locking bar (33 and 34) contains at least one hole (51 and 52), which leads into another hole (53 and 54) through the locking head (40 and 41) in such a way that the inside part of the hole (31) communicates with the outside atmosphere.

Each locking bar (33 and 34) contains at least one lengthwise groove (55 and 56), shorter than the bar and limited at each end by stops (57 and 58, 59 and 60).

A pin (61 and 62) fixed to the body of the adapter (2) slides inside each of these grooves, on an axis perpendicular to the common axis line of the locking bars.

The two inner stops (57 and 59) limit the distance between the outer ends (38 and 39) of the locking bars (33 and 34), when in the locking position, to the inside diameter of the sleeve (3).

The two outer stops (58 and 60) limit the distance between the outer ends (63 and 64) of the two locking heads (40 and 41), when in the unlocking position, to the outside diameter of the cylindrical part (17) of the adapter.

The compression spring (37) is illustrated in FIGS. 1, 5 and 7. Its ends fit into cylindrical cavities (65 and 66) inside the inner ends (35 and 36) of the locking bars (33 and 34). The spring ends are thus surrounded by skirts (67 and 68), extending the cylindrical circumference of the locking bars further inwards towards the centre of the adapter. This makes the bars longer, ensuring fuller guidance, and also enables the compression spring to function more efficiently.

The cross-sectional area of the locking heads (40 and 41) is less than the cross-sectional area of the locking bars (33 and 34), so that the heads can pass through the slots in the side of the sleeve (3), whereas the locking bars (33 and 34) are too large to pass. The effect of the spring is to push the outer ends of the bars against the inside surface of the sleeve (3), when in the locking position.

The locking bars (33 and 34) generally have a circular cross section, whereas the locking heads (40 and 41) are preferably square, fitting within the cross-sectional area of the bars.

Locking procedure

The device described above is lowered from a floating platform, equipped with locating and positioning means of a type known in the prior art. By remote-control methods, with monitoring by television or an ultrasonic device, the adapter (2) is positioned directly over the sleeve (3), on the same axis line, then inserted into it. It then moves downwards by gravity.

The studs (24 and 25) come into contact with the guide ramps, which guide them to their final recesses. The adapter, which is suspended from the guide line by a swivel attachment, can rotate freely.

The studs (24 and 25) move down inside the recesses (28 and 29), until the flat annular surface (21) on the adapter (2) comes to rest on the upper edge (22) of the sleeve (3), thereby completing longitudinal positioning of the adapter.

While the adapter (2) is moving down inside the sleeve (3), the sloping lower surface (48) of the locking head (40) comes into contact with the tapering circumference (49) of the upper edge (22) of the sleeve (3). These angled surfaces (48) act as retracting cams, causing the locking heads to retract within the inside diameter of the sleeve (3).

When the studs (24 and 25) enter the recesses (28 and 29), the retracted locking heads (40 and 41) are positioned just above the slots (44 and 45), and when the flat annular surface (21) of the adapter (2) comes to rest on the upper edge (22) of the sleeve (3), the locking heads (40 and 41) are located opposite the slots (44, 45) into which they penetrate by action of compression spring 37. Locking is performed in such a way that, when the adapter (2) is at rest on the sleeve (3), a clearance of about 2 mm is left between the upper edge (47) of the slot and the upper surface on the locking head (40).

Unlocking procedure

Since the cross-sectional area of the locking slots (44 and 45) is less than the cross-sectional area of the locking bars (33 and 34), part of the outer ends of these components is pressed against the inside surface of the sleeve by the compression spring.

When the order to disconnect is given, a disconnecting device, of a type known in the prior art, is lowered, either by sliding it down the guide line, or from manned or remote-controlled underwater equipment. This type of device comprises two opposing pins, the cross-sectional area of which fit inside the areas of the locking heads (40 and 41). The ends of these pins come into contact with the locking heads, whereupon they apply pressure greater than the force of the compression spring (37), so that the two locking heads are pushed back inside the adapter (2). The guide line is then pulled from the surface, withdrawing and releasing the adapter (2) from the sleeve (3).

In an emergency, for example if weather conditions suddenly deteriorate, when there is not enough time to lower and position the disconnecting device, the guide line is simply pulled hard enough to shear off the bolts attaching the locking heads to the bars. The adapter is then free to move, and is withdrawn from the sleeve, while the shape of the locking heads causes them to drop out of the slots in which they were located, thereby leaving the sleeve ready for the next locking operation.

We claim:

1. A connection and disconnection device for a guide line (1) between a floating platform and an underwater installation, comprising a cylindrical adapter (2), attached by a connector device to the end of the guide line (1), and provided with a guiding and directional mechanism (24, 25), a longitudinal positioning surface (21), and at least one locking head (40) coming into contact respectively with guide ramps (26, 27), with a positioning seat (22), and at least one locking head slot (44), on the inside of a cylindrical sleeve (3), this sleeve (3) extending upwards from a guide post (4) fixed to the underwater installation, this locking head (40), constituting an extension of the locking bar (33) bearing on a compression spring (37), the lower surface of the said locking head, which forms an angle with the axis of the adapter, constituting a retracting cam, designed to come into contact with a tapering surface (49) cut into the inside upper edge of the sleeve (3), while the upper surface (46) of the said locking head, which is perpendicular to the axis of the adapter, forming a locking edge designed to rest on the upper edge of the locking slot (44), and wherein each locking head (40) comes into contact with a locking bar (33), extended by a shearing bolt (42), and in that the locking slots (44) are formed of openings in the side of the sleeve (3).

2. A device according to claim 1, in which each locking bar (33) and each locking head (40) is provided with bore-holes (52), and (53), in line with one another, in such a way as to provide communication between the inside of the cavity (44) and the outside atmosphere.

3. A device according to claim 2, in which the ends of the compression spring (37) fit into a cylindrical cavity (65, 66) in the inner ends of the locking bars (33, 34) and opens towards the interior of the cylindrical slots (31).

4. A device according to claim 2, in which the cross-sectional area of each locking head (40, 41) is smaller than the cross-sectional area of the locking bar (33, 34).

5. A device according to claim 4, in which each locking bar (33, 34) has a circular cross section, the cross section of each locking head (40, 41) being a square which fits inside the cross-sectional area of the locking bar.

6. A device according to claim 2, in which each locking bar (33, 34) contains at least one longitudinal groove (55, 56) shorter than the length of the bar, limited at each end by a stop (57, 58) and (59, 60) and inside which slides a stud (61, 62) fixed to the adapter (2) on an axis perpendicular to the common axis of the locking bars, the two inner stops limiting the distance between the two outer ends of the locking bars (57, 59) when in locking position on the inside diameter of the sleeve (3), the two outer stops (58, 60) limiting the distance between the two outer ends of the locking heads, when in the unlocking position, to the outside diameter of the cylindrical part (18) of the adapter (2).

7. A device according to claim 1, in which the adapter (2) comprises a cylindrical part (17), attached to the connector device (5), this element (17) being extended by a cylindrical element (18), the diameter of which is smaller than the sleeve diameter (3), this element (18) being extended by a bulb-shaped component (19), the larger part (20) of which has a spherical circumference, slightly smaller than the inside of the sleeve, this spherical part (20) comprising two studs (24) and (25) diametrically opposite in its equatorial circumference, and which are designed to be supported by spiral guide ramps (26) and (27) and their symmetrical guides (26') and (27') on the inside surface of the sleeve, thereby forming means of directional positioning of the adapter inside the sleeve.

8. A device according to claim 1, in which the connector between the adapter (2) and the guide line (1) is of the type leaving the adaptor (2) free to rotate on its own axis.

9. A device according to claim 1, in which the connector (5) between the adapter (2) and the guide line (1) is a swivel device.

* * * * *